United States Patent

Davis et al.

[15] 3,649,357

[45] Mar. 14, 1972

[54] PRODUCTION OF COLORED IMAGES ON PAPER BASES

[72] Inventors: Gerald T. Davis; Robert A. Fetters, both of Chillicothe, Ohio

[73] Assignee: The Mead Corporation, Dayton, Ohio

[22] Filed: Oct. 29, 1970

[21] Appl. No.: 85,249

Related U.S. Application Data

[63] Continuation-in-part of Ser. No. 610,766, Jan. 23, 1967.

[52] U.S. Cl. ........................................117/36.2, 117/155 C
[51] Int. Cl. .........................................................B41m 5/22

[56] References Cited

UNITED STATES PATENTS

| 1,277,904 | 9/1918 | Gesell | 117/155 |
|---|---|---|---|
| 2,463,501 | 3/1949 | Aruim | 260/51 |
| 2,972,547 | 2/1961 | Tiem | 117/36.2 |
| 3,020,170 | 2/1962 | Macaulay | 117/36.2 |
| 3,244,549 | 4/1966 | Farnham et al. | 117/36.2 |
| 3,296,965 | 1/1967 | Reif et al. | 117/17.5 |
| 3,322,557 | 5/1967 | Schwab | 117/36.2 |
| 3,374,768 | 3/1968 | Lawes et al. | 117/17.5 |
| 3,427,180 | 2/1969 | Phillips | 117/155 |
| 3,451,338 | 6/1969 | Baum | 117/36.2 |
| 3,466,184 | 9/1969 | Bowler et al. | 117/36.2 |
| 3,466,185 | 9/1969 | Bowler et al. | 117/155 |

Primary Examiner—Murray Katz
Attorney—Irvin V. Gleim, Edward M. Tritle, Francis M. Crawford and Wilson G. Palmer

[57] ABSTRACT

Colored images are formed on paper bases by contacting the latter at the points where said image is desired with a colorless dye dissolved in a carrier fluid, the surface of said paper base being coated with a uniform, discontinuous coating of an essentially solid, water-insoluble, fusible phenol-formaldehyde condensation polymer at the rate of 0.01 to 0.2 lb. per 1,300 square feet of surface.

7 Claims, No Drawings

PRODUCTION OF COLORED IMAGES ON PAPER BASES

This application is a continuation-in-part of our United States, Ser. No. 610,766, filed Jan. 23, 1967.

This invention relates to the production of a reactant sheet for use as a receiving and color developing sheet for colorless dye images and to a method of developing such images.

Reactant sheets of this type are usually used in conjunction with a transfer sheet which contains a colorless marking ink such as crystal violet lactone dissolved in a carrier liquid such as chlorinated diphenyl. A pressure image such as is produced by the striking of a typewriter key releases, in areas where the pressure is applied, a small amount of colorless marking ink and transfers it to the surface of the receiving sheet. A colored image develops in the areas where the marking ink is transferred to the reactant sheet. Such a reactant sheet and process for making it are described in U.S. Pat. No. 2,699,432 issued to Marra et al. In this patent, a reactive pigment such as attapulgite (attapulgus clay) or a zeolitic material is dispersed in an aqueous binder composition containing ammonium caseinate, sodium silicate, and a butadiene-styrene copolymer latex. The pigmented coating composition, when coated and dried on a paper base, produces a blue mark where it is contacted by a colorless marking ink containing crystal violet lactone. In general, it is necessary to apply 2 to 3 pounds or more per ream (1,300 square feet) of the above dried coating to paper in order to fully develop the colorless dye.

The necessity of using such heavy coatings on paper has a detrimental effect on the strength properties and appearance and feel of the paper. This is particularly so where extremely thin papers are desired as the weight of the coating may be as much as 30 percent of the total paper weight. Thin papers of high strengths are necessary in the production of manifold forms where the paper is subjected to punching, perforating, folding and collating operations.

Incorporation of a reactive pigment into the paper and at the wet end of the paper machine has also been tried but has not been commercially successful since large amounts of pigment, at least 16 percent of the finished paperweight, were required to produce a satisfactory colored mark with a colorless marking ink. The presence of the reactive pigment in the paper had a detrimental effect on the strength and aging properties of the paper. Furthermore, the bulk of the reactant pigment was not on the surface of the paper and, thus, sharp and clear images were not produced.

It has been found that a relatively uniform thin coating of a solid phenolic reactant can be applied to a paper base by contacting said paper base with a thin film of a solution consisting essentially of said phenolic reactant in a volatile organic solvent and immediately evaporating said solvent before substantial penetration into the paper base takes place and so that said phenolic reactant is retained essentially completely on the contacted surface of the paper base. Thusly applied, the phenolic reactant is readily available for reaction with a colorless dye and it has been found that well-defined colored marks are formed on the surface of the paper base on marking the surface with a colorless marking ink containing a colorless dye dissolved in a carrier liquid without any substantial marking showing on the reverse side of the sheet.

The amount of phenolic reactant coating necessary to produce a satisfactory mark is in the range of 0.01 to 0.2 pound per ream of 1,300 square feet, depending somewhat on the particular phenolic reactant used, which amount is found to give uniform, discontinuous film of phenolic polymer on the surface of said sheet. Such a small amount of coating does not materially affect the properties, particularly the strength, handling and printing properties, of the paper base to which it is applied. Thus, reactant sheets resembling lightweight bond papers may be produced, whereas it was necessary to coat the prior art mechanical sheets with 2 to 3 pounds per ream of reactant coating to obtain commercially acceptable paper. Such coated prior art reactant sheets do not have the handling and printing properties of bond papers and the strength properties for the same weight of paper are considerably less.

Accordingly, it is an object of this invention to provide a reactant sheet for developing colorless dye images having improved strength, handling and printing properties.

Another object of the invention is to provide a reactant sheet in which a phenolic reactant is essentially completely retained on the paper surface and is readily available for developing colorless dye images applied thereon.

It is another object of the invention to provide a method of making the above reactant sheet.

A further object of the invention is to provide a method of producing a colored image on the surface of a reactant sheet having improved strength, handling and printing properties over those of prior art reactant sheets.

The color developing reactants used in the present invention are essentially solid, nonvolatile, water-insoluble, fusible phenolic polymers. Such materials must be capable of reacting with a colorless dye dissolved in a carrier liquid to produce a colored material. Since the color is developed only on intimate molecular contact of the phenolic materials with the colorless dye, the phenolic materials must be soluble at least in limited amounts in the carrier liquid. They also should be chemically stable and particularly nonreactive toward the papermaking chemicals present in the paper base. It is also desirable that the phenolic materials are relatively colorless and that they should not discolor with age. Suitable phenolic polymers are characterized by having at least one position ortho to the phenolic OH group occupied by a hydrogen, halogen, hydroxyl, methyl or methylene group. A preferred group of phenolic materials are the para substituted phenol formaldehyde novolak condensation polymers, for example, a paraphenylphenol formaldehyde condensation polymer having a ring and ball softening point of 195° to 225° F. Other suitable compounds of this type include novolak condensation polymers of paraalkylphenol-formadehyde, where the alkyl radical contains four to eight carbon atoms, parachlorophenol-formaldehyde, orthochlorophenol-formaldehyde, and the mixed novolak condensation polymers of parachloro-paraalkylphenols in 1:1 to 3:1 mol ratio with formaldehyde, and mixtures of said polymers.

The colorless dyes may be selected from certain of the quinoid-ionic-type dies, particularly various lactone, lactam, or auramine leuco dyes such as, for example, crystal violet lactone, malachite green lactone, 1, 1-bis(para amino-phenyl) phthalen and 2, 5-dichlorophenyl leuco auramine.

The reactant coating composition is essentially a solution of the phenolic polymer in a volatile organic solvent. The solvent should be fast drying and should preferably dissolve up to an equal amount of the phenolic polymer so that the desired amounts of dried phenolic materials can be obtained by applying the thin wet films of the thickness specified by this invention. Such fast drying solvents include toluene, xylene, isopropryl alcohol, ethyl alcohol, acetone, methyl ethyl ketone and butyl acetate.

The phenolic coating composition may be applied to the paper base by any method whereby there is obtained a uniform wet film of the coating composition of the required composition having a thickness of substantially not more than $2 \times 10^-$ inches. This corresponds to a wet film as applied to the paper having a thickness of $1 \times 10^{-4}$ inches. Above this limit, the phenolic coating composition will penetrate the paper base. For example, penetration of a 15-pound form bond paper occurred when contacted with a wet film of phenolic coating composition (50 percent p-phenylphenol aldehyde condensate solution in toluene) having a thickness of $2.8 \times 10^-$$^4$ inches and a film having the desired properties was not obtained.

Below an applied thickness of $5 \times 10^{-6}$, it is impossible to obtain a uniform coating of dried phenolic polymer of sufficient quantity to develop a well defined colored mark. A preferred range of applied wet film thickness is $2 \times 10^{-5}$ to $8 \times 10^{-5}$ inches.

The preferred method of applying the thin coating of phenolic polymer is by a modified offset gravure printing means. The phenolic coating composition is metered onto an etched or engraved gravure roll by passing through a pressure nip formed by the gravure roll and a hard surfaced roll, i.e., hard rubber roll. Metered film is then transferred in part by rolling pressure contact to a roll of softer composition; i.e., a soft rubber roll, from which it is transferred to the surface of the paper base by rolling pressure contact therewith. The pressure between the soft rubber roll and a roll backing the paper is not critical but is of a low order, being just sufficient to establish positive uniform contact of the film of coating with the surface of the paper base.

Using the thin wet films of this invention and fast drying solvents, the solvent portion of the coating composition, whether by air-drying or ovendrying, is evaporated so quickly that penetration of phenolic polymer into the base is essentially eliminated. Thin coatings of phenolic polymer have been applied to as widely diversified paper surfaces as porous filter paper and a dense pigment coated printing paper. Examination of the above-coated papers showed that in all cases phenolic polymer was tightly adhered to and essentially completely retained on the exposed surfaces of the top layer of fibers or pigment particles, in the form of a uniform, discontinuous film. Both of the above phenolic coated papers gave well-defined colored images when tested with a colorless marking ink containing crystal violet lactone.

The concentration of phenolic polymer in the coating composition does not affect penetration of the composition into a paper base when applied by the method of the present invention. Coating compositions containing from 1 to 40 percent of phenolic polymer, a paraphenylphenol-formaldehyde polymeric condensate, in toluene were applied to a form bond paper without observable penetration of phenolic polymer. The preferred amount of paraphenylphenol is 0.02 to 0.2 pound per ream. Both above and below this amount, the intensity of the colored mark is poorer than within the preferred range.

At the wet film thicknesses used in the process of the present invention, viscosity of the phenolic coating composition does not affect the penetration of phenolic polymer. However, it has been found that using the preferred method of the present invention, it is preferred to keep viscosity of the phenolic coating composition low, in fact below that which causes an excess of liquid composition over that which is in the recesses of the gravure roll to pass between the hard rubber roll and the gravure roll.

By way of illustration, but not by way of limiting the scope of the invention, the following examples are set forth.

EXAMPLE 1

A 15 pound per ream uncoated form bond paper containing about 6 percent clay filler was coated at 800 feet per minute using offset gravure printing means as previously described. A 17.2 percent solution of paraphenylphenol-formaldehyde condensate in toluene was applied in a wet film thickness of about $7.3 \times 10^{-5}$ inches and dried in a forced air oven at 188° F. to give a dried coating of condensate of 0.074 pound per ream on the surface of the paper.

EXAMPLE 2

A 13 percent solution of paraphenylphenol formaldehyde condensate in toluene was applied to 15 pound form bond paper in the manner of Example 1. A $7.1 \times 10^{-5}$ inch wet film thickness of the solution was applied to the paper and the dried film was 0.055 pound per ream.

A comparison of the properties of the coated papers prepared in Examples 1 and 2 with properties of a commercially prepared attapulgus clay coated reactant sheet is given in the following table.

| Properties | Prior art attapulgus clay reactant sheet | Reactant sheet prepared by— | | Form bond paper |
|---|---|---|---|---|
| | | Ex. 1 | Ex. 2 | |
| Basis weight (1300 sq. ft.) | 16.4 | 15.3 | 14.9 | 15.3 |
| Burst factor | 19.4 | 24.2 | 25.0 | 23.6 |
| Tear factor: | | | | |
| MD | 59.7 | 71.7 | 73.6 | 73.0 |
| AM | 68.8 | 84.9 | 85.7 | 86.3 |
| Gurley stiffness: | | | | |
| MD | 68.7 | 95.5 | 93.8 | 95.5 |
| AM | 33.5 | 48.6 | 43.6 | 46.9 |
| Perforation strength [1]: | | | | |
| MD | 188 | 248 | 205 | 272 |
| AM | 305 | 411 | 406y | 469 |
| Sheffield smoothness coat side | 93 | 113 | 116 | 124 |
| Calender intensity [2] | 50.0 | 54.6 | 57.9 | |
| Typewriter intensity [3] | 62.7 | 63.2 | 65.9 | |
| Legibility of typed characters | Good | Good | Good | |

Note 1 — The perforation strength was determined by the method described in U.S. Pat. No. 3,099,153.

Note 2 — Calender intensity is a contrast ratio whereas the lower the numerical values, the greater the intensity of color. This value is determined by placing the coated side of a reactant paper to be tested in contact with the coated side of a standardized transfer sheet, such as is described in U.S. Pat. No. 2,711,375 granted to Robert W. Sandberg on June 21, 1955, and then passing the superimposed papers through a calender machine, the rolls of which are subjected to a known standard load. A Bausch & Lomb Opacimeter is employed to obtain at least three measurements of the percent reflectance of the printed and unprinted areas of the reactant paper 30 seconds after calendering and the results of such measurements are averaged. The calender intensity ratio in percent is then calculated according to the formula:

$$\text{Calender intensity} = \frac{\text{Average printed area reflectance}}{\text{Average nonprinted area reflectance}} \times 100$$

Note 3 — Typewriter intensity is a contrast ratio similar to calender intensity. It is determined in a similar way to calender intensity except that instead of passing the superimposed transfer and reactant paper through a calender, closely spaced "m's" are typed on the superimposed papers using a special electric typewriter with no ribbon and the opacimeter readings are made on the reactant paper 20 minutes after typing.

Note 4 — This is a subjective test made by typing on a transfer sheet superimposed on a reactant sheet and judging the appearance of the typed reproduction.

Coating of the form bond paper with the phenolic polymers has no significant effect on the strength properties of the paper.

The superior strength properties of the paper coated with paraphenylphenol formaldehyde condensate as prepared in Examples 1 and 2 over those of the prior art attapulgus clay coated sheet are apparent from a comparison of the burst, tear, stiffness and perforation strength results. The legibility of the typed characters is equivalent to that produced on the prior art reactant sheet. The calender and typewriter intensity of the reactant sheet produced by Example 1 were 54.6 and 63.2, respectively, as compared to 50.0 and 62.7 for the prior art sheet. Calendering of the reactant sheet of Example 1 to a 90 Sheffield smoothness, as compared to the prior art sheet smoothness of 93, produced a reactant sheet with calender and typewriter values intensity of 52.3 and 72.5, respectively.

The handling and printing properties of the reactant sheet prepared in Example 1, when run on an offset form press and subsequently collated, were found to be the same as for the uncoated form bond paper.

Since the examples described are for the purposes of illustration only, it is to be understood that the present invention includes all modifications and equivalents which fall within the scope of the invention as defined by the appended claims.

What is claimed is:

1. A method of producing a colored image on a paper base, which comprises coating the surface of said paper base with a thin film of a solution consisting essentially of an organic solvent solution of an essentially solid, nonvolatile, water-insoluble, fusible phenol-formaldehyde condensation polymer capable of reacting with colorless dyes to form a colored material, said coating being applied in an amount sufficient to give a uniform, discontinuous dried coating of the order of 0.01 to 0.2 pound of solid polymer per 1,300 square feet of paper base, immediately evaporating said solvent before appreciable penetration of said paper base by said solution of said phenolic polymer, and subsequently forming on said dried surface a colored image by contacting said dried film at the points where said image is desired with a colorless dye dissolved in a carrier fluid in which said phenolic polymer is at least partially soluble whereby said phenolic polymer and colorless dye mix and react to form a relatively permanent colored image where said contact is made.

2. A method according to claim 1 wherein the wet film of coating applied to said paper base has a thickness of not substantially greater than $2 \times 10^{-4}$ inches.

3. The method according to claim 1, wherein said polymer is selected from novolak condensation polymers of paraalkylphenol formaldehyde where the alkyl radical contains four to eight carbon atoms, parachlorophenol formaldehyde, orthochlorophenol formaldehyde, paraphenylphenol formaldehyde, and the mixed novolak condensation polymers of parachloroparaalkylphenols in 1:1 to 3:1 mol ratio with formaldehyde, and mixtures of said polymers.

4. The method according to claim 1, characterized in that said colorless dye is selected from the group consisting of quinoid ionic dyes of the type of leuco, lactone, lactam and auramine dyes.

5. The method according to claim 1, characterized in that the colorless dye is selected from the group consisting of malachite green lactone, 1,1-bis (para-amino) phenyl phthalein and 2,5-dichlorophenyl leuco auramine.

6. The method according to claim 1, characterized in that the solvent for said phenolic polymer is selected from the group of fast drying solvents consisting of toluene, xylene, isopropyl alcohol, ethyl alcohol, acetone, methyl ethyl ketone and butyl acetate.

7. The method according to claim 1, wherein said volatile organic solution of phenol-formaldehyde polymer is applied to said paper substrate by a modified offset gravure printing means whereby said solution is metered onto an etched or engraved gravure roll from which it is then transferred by rolling pressure contact to a roll of softer composition from which the film of solution is transferred to the paper base substrate by rolling pressure contact therewith, and dried thereon before substantial penetration of said substrate by said solution takes place.

* * * * *